: United States Patent (10) Patent No.: US 10,794,722 B2
Amano et al. (45) Date of Patent: Oct. 6, 2020

(54) VEHICLE

(71) Applicant: Toyota Jidosha Kabushiki Kaisha, Toyota-shi, Aichi-ken (JP)

(72) Inventors: Megumi Amano, Toyota (JP); Kohei Maejima, Nagakute (JP); Chika Kajikawa, Toyota (JP); Hikaru Gotoh, Nagoya (JP); Yoshiaki Matsumura, Toyota (JP); Chiharu Hayashi, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 175 days.

(21) Appl. No.: 16/225,569

(22) Filed: Dec. 19, 2018

(65) Prior Publication Data

US 2019/0195651 A1 Jun. 27, 2019

(30) Foreign Application Priority Data

Dec. 27, 2017 (JP) .................................. 2017-252265

(51) Int. Cl.
*G01C 21/36* (2006.01)
*B60W 50/14* (2020.01)
*B60K 35/00* (2006.01)

(52) U.S. Cl.
CPC .......... *G01C 21/3697* (2013.01); *B60K 35/00* (2013.01); *G01C 21/365* (2013.01); *G01C 21/3661* (2013.01); *G01C 21/3664* (2013.01); *G01C 21/3676* (2013.01); *G01C 21/3682* (2013.01); *B60K 2370/334* (2019.05)

(58) Field of Classification Search
USPC ......................................................... 701/454
See application file for complete search history.

(56) References Cited

U.S. PATENT DOCUMENTS

2010/0191457 A1 7/2010 Harada

FOREIGN PATENT DOCUMENTS

JP 200537246 A 2/2005
JP 200925224 A 2/2009

*Primary Examiner* — Tyler D Paige
(74) *Attorney, Agent, or Firm* — Dinsmore & Shohl LLP

(57) ABSTRACT

There is provided a vehicle including (i) a vehicle main body, (ii) an input device that receives a destination input operation, (iii) a first display that displays information on a route to a destination inputted by the input device, the first display being arranged in the vehicle main body, (iv) an acquisition device for acquiring location-related information based on a current location of the vehicle main body or a location of a goal point of the vehicle main body, and (v) a second display that displays the location-related information acquired by the acquisition device, the second display being arranged in the vehicle main body.

7 Claims, 11 Drawing Sheets

VEHICLE

CROSS-REFERENCE TO RELATED APPLICATION

This application claims priority under 35 USC 119 from Japanese Patent Application No. 2017-252265 filed on Dec. 27, 2017, the disclosure of which is incorporated by reference herein in its entirety.

BACKGROUND

Technical Field

The present disclosure relates to a vehicle.

Background Art

Japanese Patent Application Laid-Open (JP-A) No. 2009-25224 discloses a technology of a car navigation device performing route guidance for a moving object, the device including a display panel on which plural symbols each having individual characteristic feature are displayed. In this technology, when any one of the plural displayed symbols is selected, the tourist information relating to the individual characteristic feature of the selected symbol is selected from a tourist facility database, and the thus selected tourist information is displayed on the display panel.

JP-A No. 2005-37246 discloses a technology in which, when a tourist site is selected from a list of tourist sites displayed on a car navigation system, video data sent from a digital camera at the tourist site is displayed.

The technology of JP-A No. 2009-25224, however, only displays tourist information relating to the individual characteristic feature of a selected symbol on the display panel. Further, in the technology disclosed in JP-A No. 2005-37246, merely a video of a selected tourist site is displayed.

In this manner, both of the technologies disclosed in these patent documents do nothing more than simply displaying tourist site information; therefore, there is room for improvement in terms of displaying, in a moving vehicle, useful information based on the location of the vehicle.

SUMMARY

According to the present disclosure, in a moving vehicle, useful information based on the location of the vehicle is displayed.

In a first aspect of the present disclosure, a vehicle includes (i) a vehicle main body, (ii) an input device that receives a destination input operation, (iii) a first display that displays information on a route to a destination inputted by the input device, the first display being arranged in the vehicle main body, (iv) an acquisition device for acquiring location-related information based on a current location of the vehicle main body or a location of a goal point of the vehicle main body, and (v) a second display that displays the location-related information acquired by the acquisition device, the second display being arranged in the vehicle main body.

In the vehicle according to the first aspect, when a destination is inputted to the input device, information on a route to the destination can be displayed using the first display.

Further, in this vehicle, the acquisition device acquires location-related information. This location-related information is information based on the current location of the vehicle main body or the location of a goal point of the vehicle main body. The second display displays the location-related information acquired by the acquisition device.

In other words, in this vehicle, not only information on a route to a destination can be displayed on the first display, but also useful information based on the current location of the vehicle main body or the location of a goal point of the vehicle main body can be displayed as location-related information using the second display.

In a second aspect, the acquisition device according to the first aspect sets the destination inputted by the input device as the location of the goal point.

In the second aspect, by setting the destination as the location of the goal point using the acquisition device, location-related information of the destination can be displayed using the second display.

In a third aspect, the acquisition device according to the first or the second aspect acquires the location-related information from an external database.

In the third aspect, by acquiring the location-related information from an external database, for example, detailed or updated information in the external database can be displayed as the location-related information using the second display.

In a fourth aspect, in a state in which the vehicle main body is stopped, the acquisition device according to any one of the first to the third aspects takes information based on the stopped location as the location-related information.

In the fourth aspect, the information based on the stopped location of the vehicle main body can be displayed as the location-related information using the second display.

In a fifth aspect, the vehicle according to any one of the first to the fourth aspects includes a selection device that selects an attribute of an occupant of the vehicle main body, and the second display displays the location-related information based on the attribute selected by the selection device.

In the fifth aspect, the most appropriate location-related information can be displayed using the second display in accordance with an attribute of an occupant.

A sixth aspect of the present disclosure is a method for displaying information based on a location of a vehicle, the method including (i) receiving a destination input operation, (ii) displaying information on a route to the received destination at a first display disposed in the vehicle, (iii) acquiring location-related information based on a current location of the vehicle or a location of a goal point of the vehicle, and displaying the acquired location-related information at a second display disposed in the vehicle.

A seventh aspect of the present disclosure is a non-transitory computer readable medium storing a program that causes a computer to execute a process for displaying information based on a location of a vehicle, the process including (i) receiving a destination input operation, (ii) displaying information on a route to the received destination at a first display disposed in the vehicle, (iii) acquiring location-related information based on a current location of the vehicle or a location of a goal point of the vehicle, and (iv) displaying the acquired location-related information at a second display disposed in the vehicle.

According to the present disclosure, in a moving vehicle, useful information based on the location of the vehicle can be displayed.

BRIEF DESCRIPTION OF THE DRAWINGS

Exemplary embodiments of the present disclosure will be described in detail based on the following figures, wherein.

DETAILED DESCRIPTION

A vehicle 102 according to the first embodiment of the present disclosure will now be described in detail referring to the figures. The simple terms "front side" and "rear side" used herein mean the front side and the rear side along the vehicle anteroposterior direction, respectively, and, the terms "upper side" and "lower side" mean the upper side and the lower side along the vehicle vertical direction, respectively.

Figure 1:
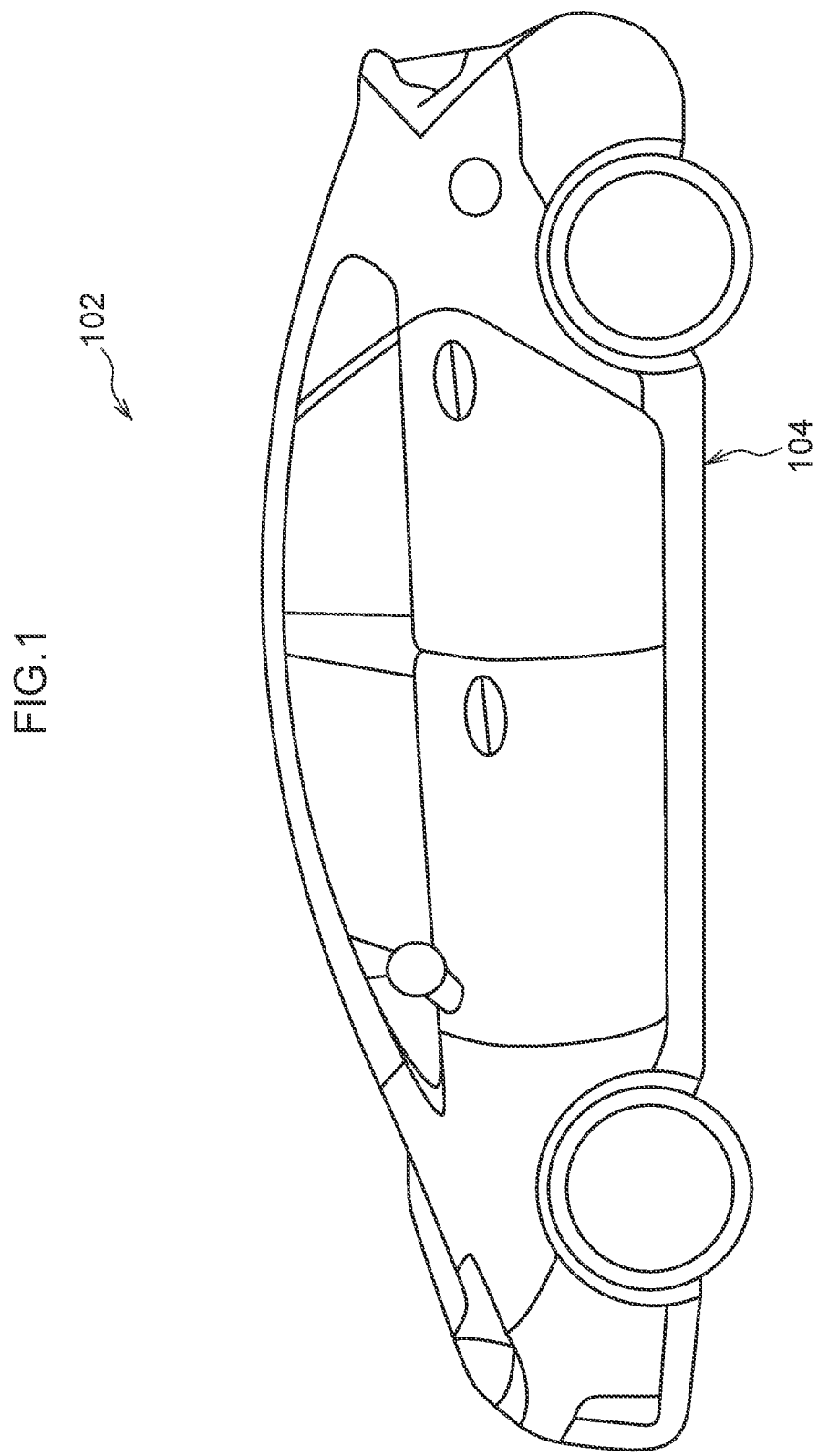
FIG. 1 is a side view illustrating a vehicle of a first embodiment.
Figure 2:
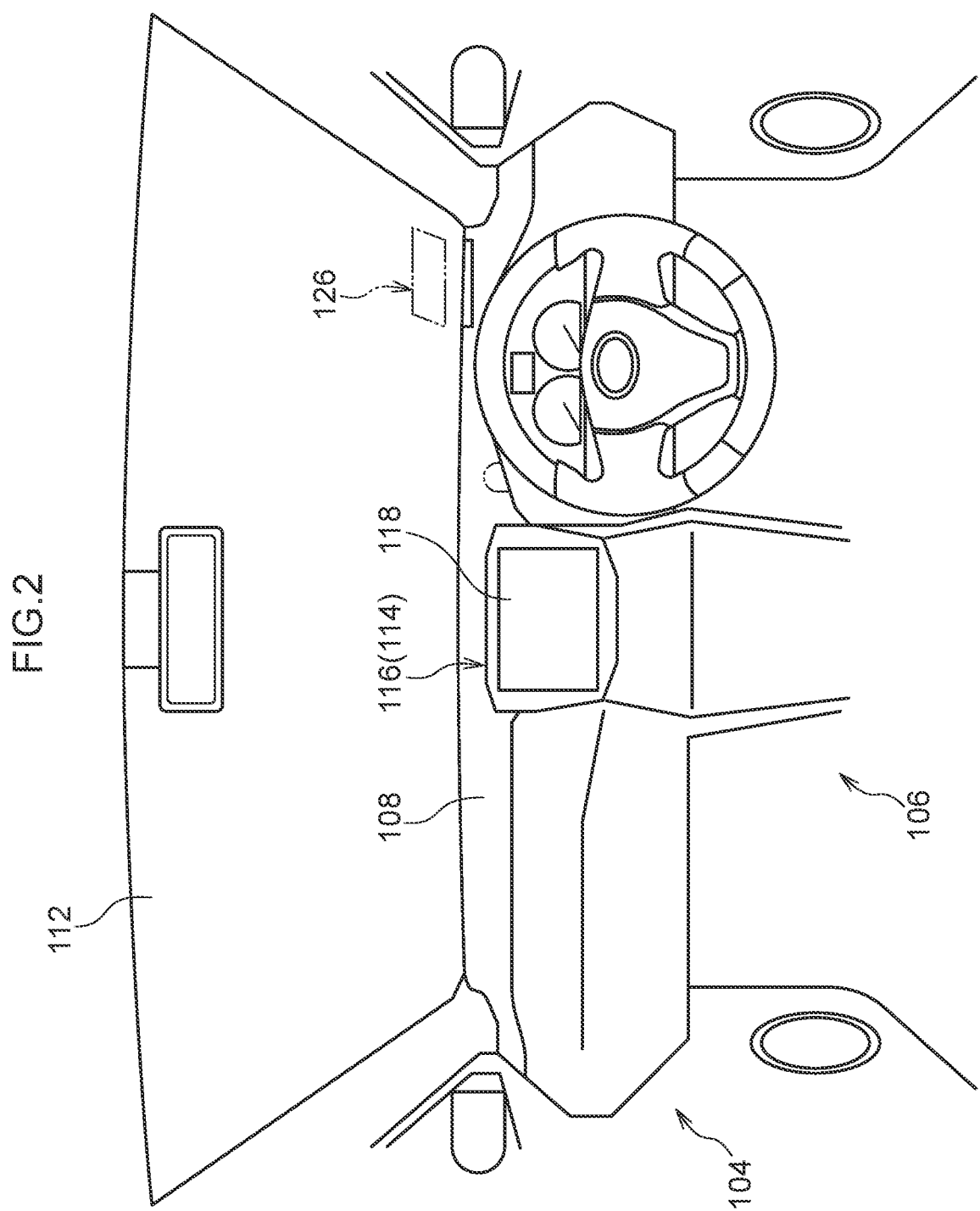
FIG. 2 is a view taken from the inside of the compartment toward the front in the vehicle of the first embodiment.

As illustrated in FIGS. 1 and 2, the vehicle 102 includes a vehicle main body 104, inside of which is a vehicle compartment 106. A dashboard 108 is arranged on the front side of the vehicle compartment 106, and a windshield 112 is arranged above the dashboard 108.

A display panel 116 is arranged on the dashboard 108. The display panel 116 is one example of the first display of the present disclosure. In this embodiment, the display panel 116 is arranged at a central position in the vehicle widthwise direction on the dashboard 108.

The display panel 116 also functions as an input panel which receives an input made by an occupant's touch operation. In other words, the display panel 116 doubles as an input device 118 (one example of the input device of the present disclosure). As the input device 118, an input display (e.g., a touch panel) or various input switches (e.g., push buttons and slide switches) may be arranged separately from the display panel 116. Further, for example, a microphone which receives a voice input from an occupant, or a sensor which detects a motion of an occupant (e.g., movement of an arm or a fingertip) can also be used as the input device 118.

In this embodiment, one example of the contents to be inputted by the input device 118 is the place where the vehicle main body 104 is heading to (occupant's destination). In this case, by displaying information on a route to the destination on the display panel 116, the display panel 116 is allowed to function as a part of a car navigation system. In other words, information that relates to a route to the destination and is useful for a car navigation system in assisting the travel and the driving operations of the vehicle is route information.

As described above, the display panel 116 is one example of the first display. The first display may also include, in addition to the display panel 116, a speaker (not illustrated) which presents information by voice. When the first display includes a speaker, by configuring the first display to present the information on the route to the destination as a voice output from the speaker, the speaker also constitutes a part of the car navigation system.

Figure 3:
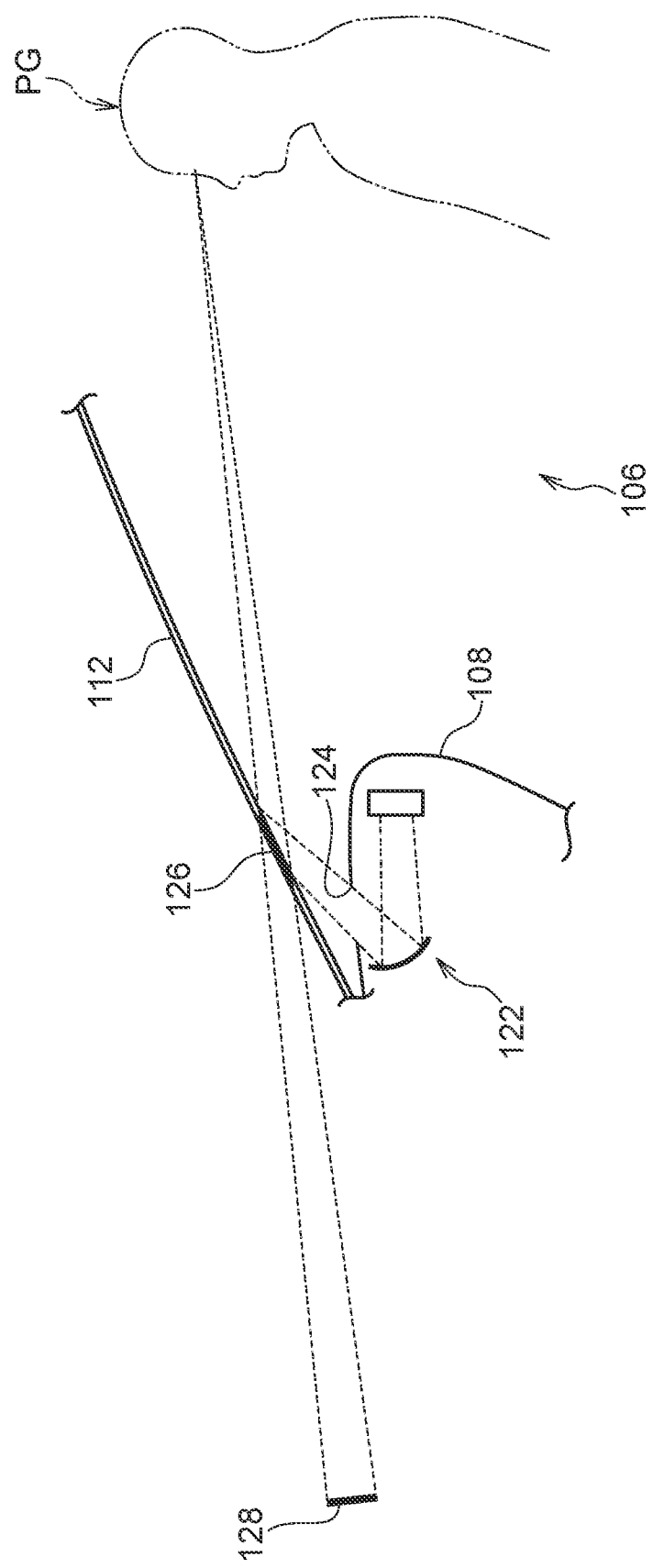
FIG. 3 is a drawing that illustrates the position of the windshield in the vehicle of the first embodiment.

As illustrated in FIG. 3, a projection member 122 is arranged inside the dashboard 108. The projection member 122 is one example of the second display of the present disclosure.

The projection member 122 projects a projected image 126 at a prescribed position on the windshield 112 through a projection window 124 of the dashboard 108. This projected image 126 is projected in such a manner to form a virtual image 128 further on the front side than the windshield 112 when viewed from an occupant PG. The occupant PG can visually recognize the projected image 126 in a superimposed manner with the sight outside the vehicle created by the light transmitting through the windshield 112. In other words, the projection member 122 of this embodiment is a head-up display.

Figure 4:
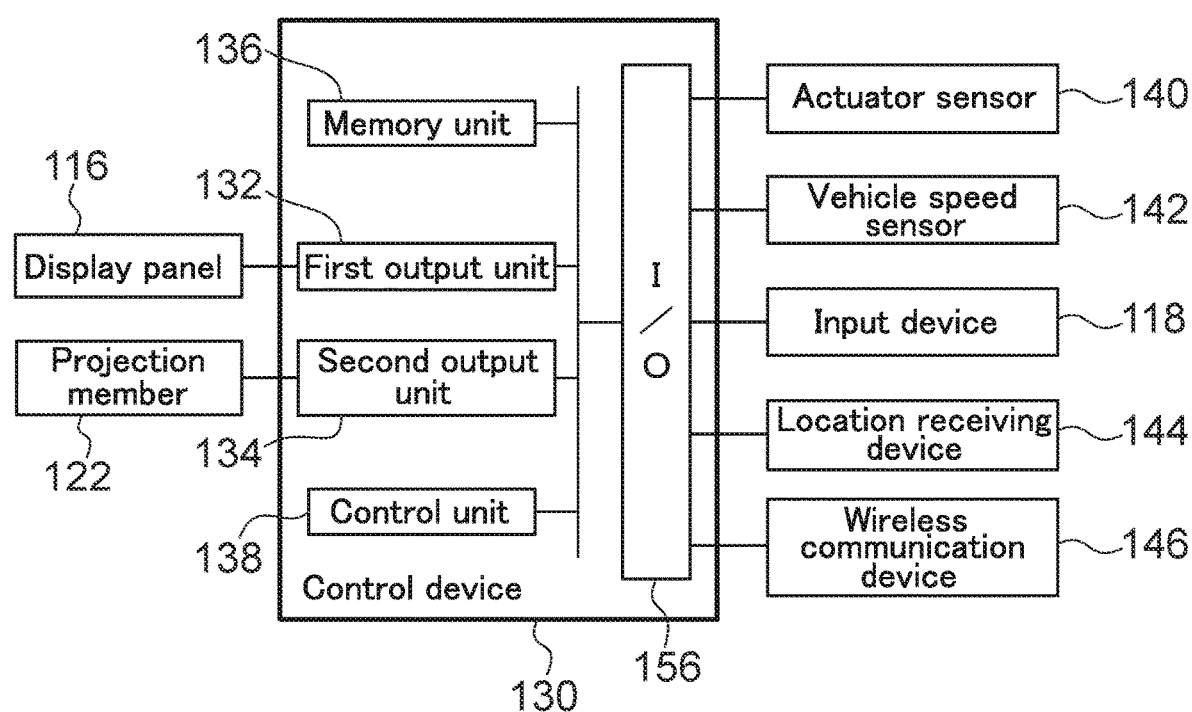
FIG. 4 is a block diagram of the vehicle of the first embodiment.

As illustrated in FIG. 4, a control device 130 is connected to the display panel 116 and the projection member 122. The control device 130 includes a first output unit 132 and a second output unit 134. The first output unit 132 and the second output unit 134 each output a prescribed image to the display panel 116 and the projection member 122, respectively.

The control device 130 also includes a memory unit 136 and a control unit 138. In the memory unit 136, for example, a location-related information display program for executing the below-described "location-related information display process" has been stored in advance. Further, the input device 118 is connected to the control device 130, and it is configured such that information inputted to the input device 118 is transmitted to the control device 130.

Figure 11:
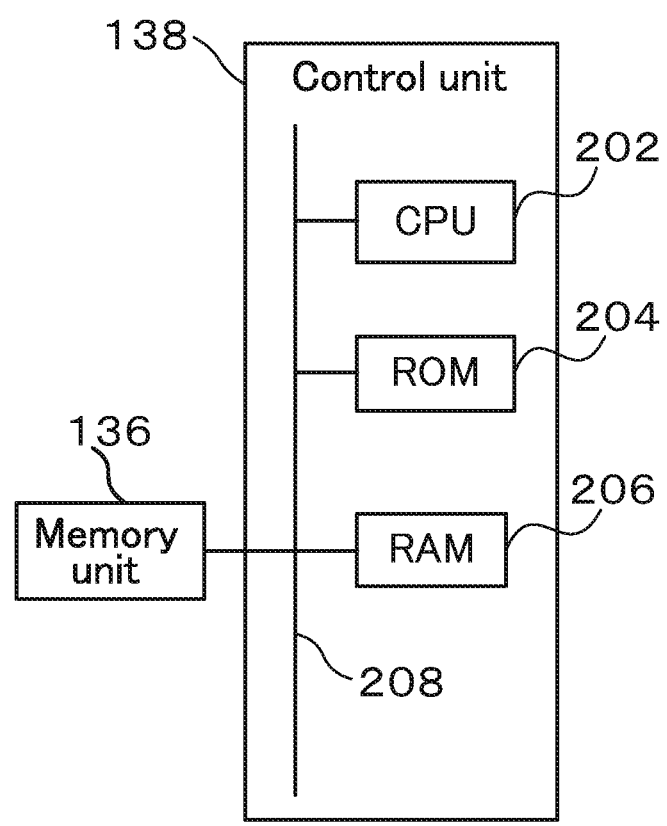
FIG. 11 is a block diagram illustrating a hardware configuration of a control unit of a control device.

FIG. 11 shows a block diagram of a hardware configuration of the control unit 138. The control unit 138 includes a Central Processing Unit (CPU) 202, a Read Only Memory (ROM) 204, and a Random Access Memory (RAM) 206. The control unit 138 is connected to the memory unit 136. These components are connected in a mutual communication mariner via a bus 208.

The CPU 202 is formed as a central processing unit so as to execute various programs and to control each portion. That is, the CPU 202 reads a program from the ROM 204 or the memory unit 136 and executes the program using the RAM 206 as a working area. The CPU 202 performs the control of each unit included in the vehicle main body 104 and various calculations in accordance with the program stored in the ROM 204 or the memory unit 136.

The ROM 204 stores various programs and various data. Note that programs and data, or portions thereof, which are described to be stored in the memory unit 136 throughout the present disclosure, can be stored at the ROM 204 instead of the memory unit 136. The RAM 206 stores the programs or the data temporarily as a working area.

For convenience of explanation, hereinafter, performing various functions of the vehicle main body 104 by the ROM 204 of the control unit 138 executing the location-related information display program stored in the memory unit 136 is described as that the control unit 138 controls the vehicle main body 104.

To an I/O (Input/Output) port 156 of the control device 130, in addition to the input device 118, an actuator sensor 140, a vehicle speed sensor 142, a location receiving device 144 and a wireless communication device 146 are also connected. The control unit 138, in accordance with the various information inputted to the control device 130, processes image information to be outputted from each of the first output unit 132 and the second output unit 134 to the display panel 116 and the projection member 122.

To the control device 130, the actuator sensor 140, which detects the on-off state of the actuator of the vehicle, and the vehicle speed sensor 142, which detects the vehicle speed, are connected. The term "actuator" refers to a mechanism in the case of a vehicle having the mechanism such as an engine, or a motor in the case of a vehicle having the motor such as an electric motor such as a motor. Further, in the case of an automobile having both a mechanism and a motor, the term "actuator" refers to both of them, and the actuator is judged to be in an off state when the mechanism and the motor are both off.

The location receiving device 144 receives current location information of the vehicle 102 from, for example, a global positioning system (GPS). The wireless communication device 146, for example, wirelessly communicates with an external server via an interne connection or the like to transmit and receive information. The wireless communication device 146 of this embodiment is capable of acquiring location-related information based on the location of the vehicle 102 and is one example of the acquisition device of the present disclosure.

The "location" in the "location-related information" includes both the destination inputted from the input device 118 and the current location of the vehicle main body 104.

The "location-related information" is unique information associated with the "location" according to the "location" of the vehicle main body 104. The "location-related information" includes, for example, weather information according to the "location" of the vehicle main body 104 (e.g., weather, temperature, and weather advisory/warning), road conditions (e.g., traffic congestion/jam conditions, construction/lane restriction information), and neighboring facility information (e.g., holidays, business hours, special events, congestion status, parking area conditions, and bargain sale information for the case of a commercial facility). These information can be acquired from an external server by the wireless communication device 146. The wireless communication device 146 is one example of the acquisition device of the present disclosure.

The "location-related information" further includes, for example, colors, marks and characters that are set in accordance with the "location", as well as quiz-format information and guide-format information that are presented to the occupant PG. The "quiz-format information" refers to information presented to the occupant PG in the form of problems and their correct answers. The "guide-format information" refers to information in the form sequentially guiding the surrounding situation, notable tourist spots and the like in accordance with changes in the location of the moving vehicle main body 104. The guide-format information may be included in the quiz-format information or, conversely, the quiz-format information may be included in the guide-format information. These information can be acquired from an external server; however, they may also be installed in the memory unit 136 inside the control device 130 in advance.

In this case, the control device 130 itself is one example of the acquisition device. The control unit 138 of the control device 130 reads out a prescribed program stored in the memory unit 136 and executes the control of the acquisition device of the present disclosure.

Figure 5:
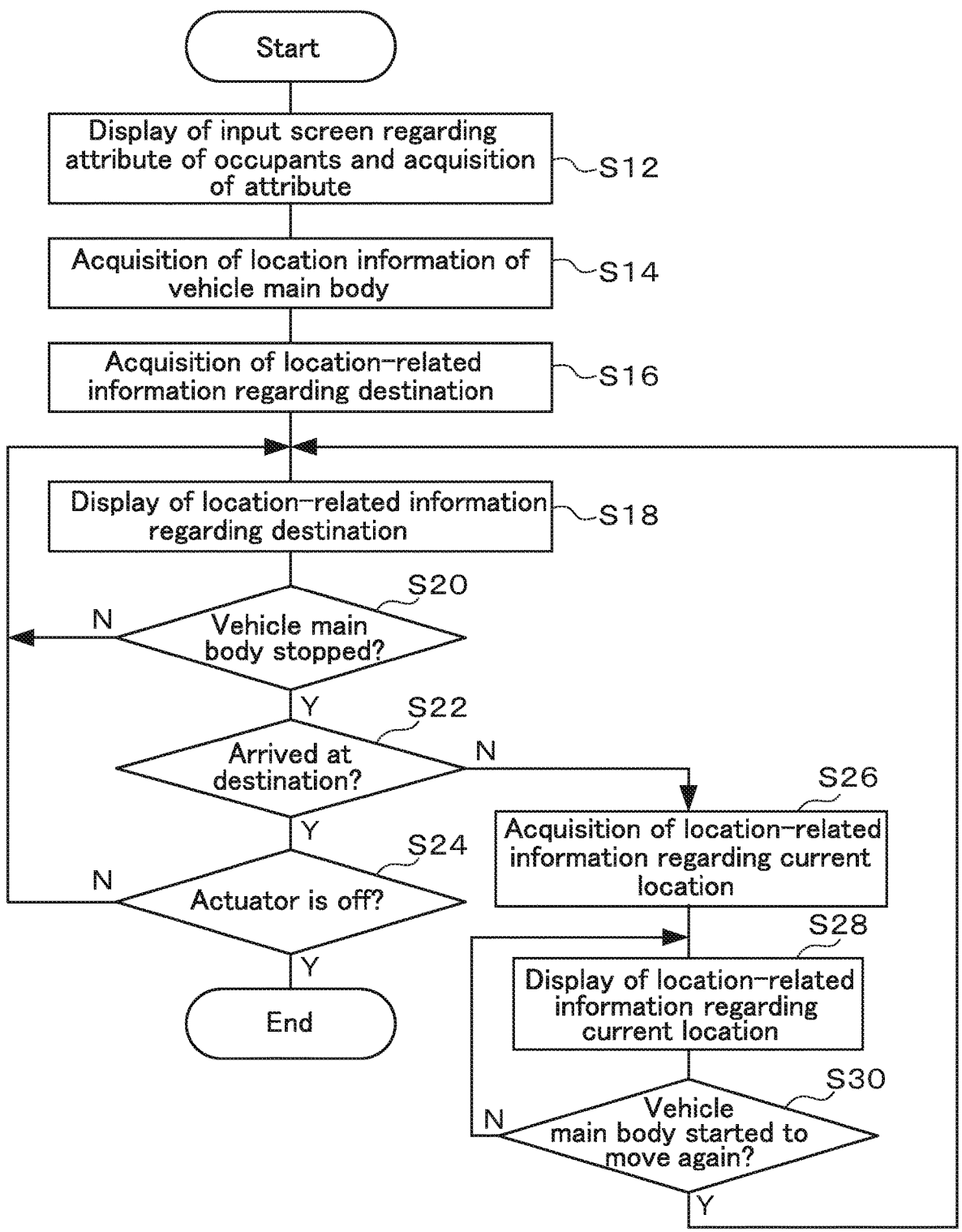
FIG. 5 is a flow chart of a location-related information display process in the vehicle of the first embodiment.
Figure 6:
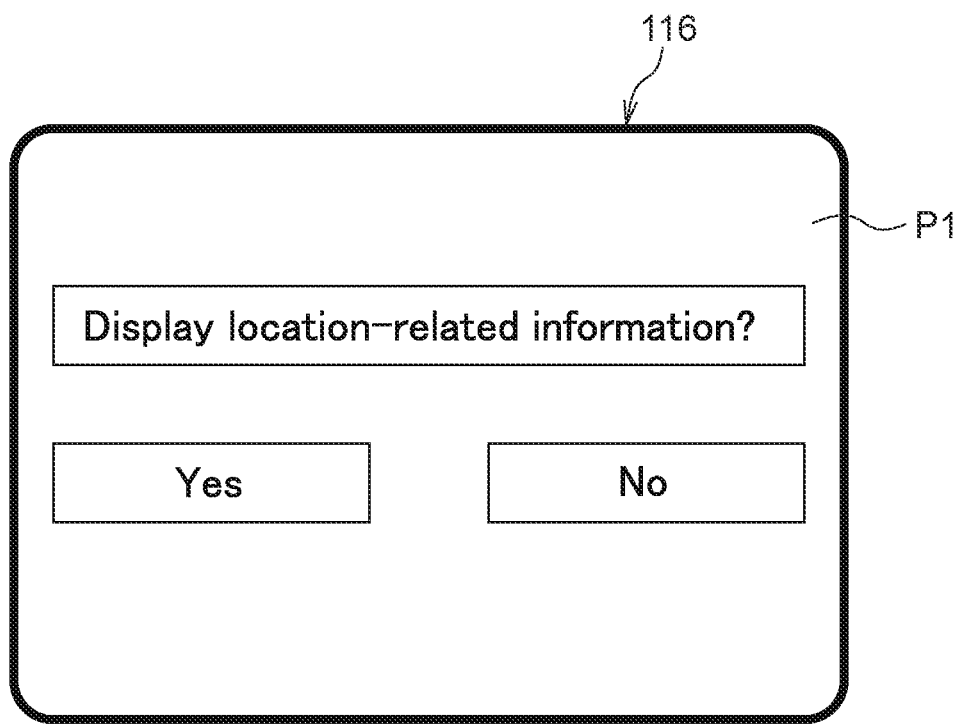
FIG. 6 is a drawing that illustrates one example of an image displayed on a display panel in the vehicle of the first embodiment.

Next, a method of displaying the "location-related information" based on the "location" of the vehicle 102 in the vehicle 102 of this embodiment will be described. In the vehicle 102 of this embodiment, the control unit 138 of the control device 130 reads out a prescribed program stored in the memory unit 136 and, in accordance with the flow illustrated in FIG. 5, executes a "location-related information display process" for displaying a prescribed display content using the display panel 116 and the projection member 122. In the execution of this "location-related information display process", as illustrated in FIG. 6, the control device 130 displays a selection screen P1, which asks whether or not to display the location-related information regarding the destination, on the display panel 116. Then, if it is judged that an input for not displaying the location-related information has been made, the "location-related information display process" is not executed. In other words, the "location-related information display process" is executed when it is judged that an input for displaying the location-related information has been made.

For the execution of the "location-related information display process", the following descriptions assume that the destination of the vehicle 102 has already been inputted. However, if the destination of the vehicle 102 has not been inputted, the control device displays a screen for inputting the destination and, after the destination is input, executes the "location-related information display process".

Figure 7:
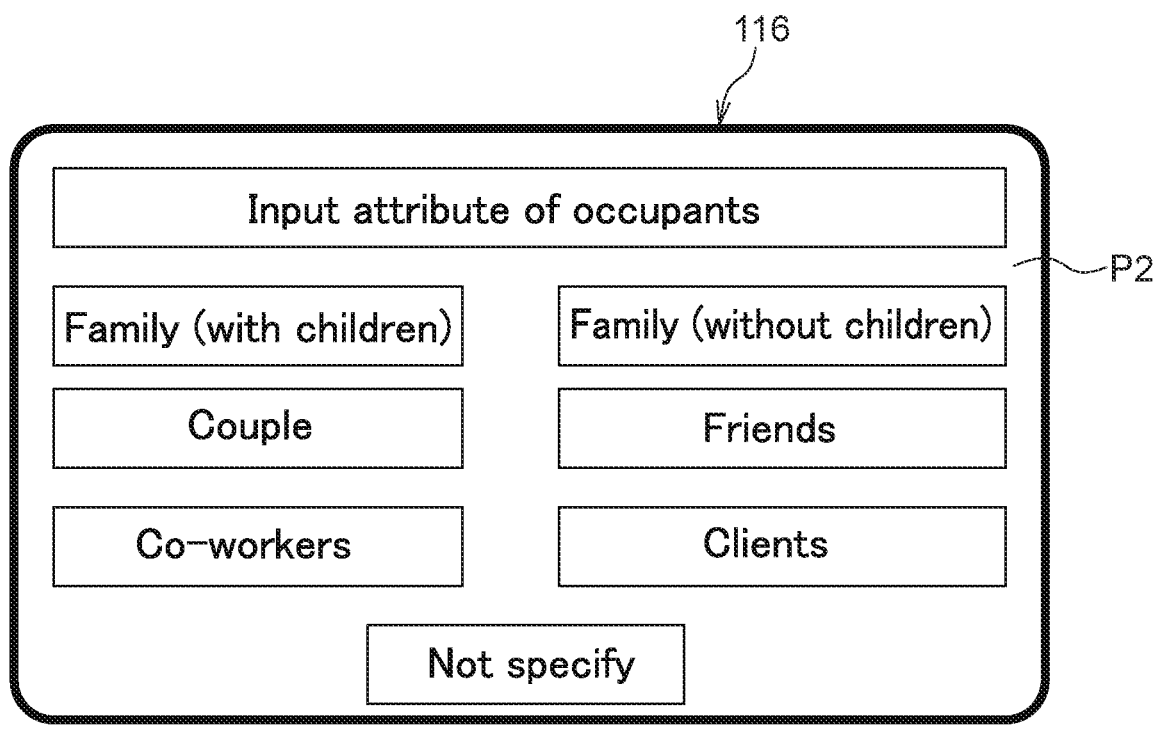
FIG. 7 is a drawing that illustrates another example of the image displayed on the display panel in the vehicle of the first embodiment.

In the step S12, as illustrated in FIG. 7, the control device 130 displays an input screen P2 regarding the attribute of an occupant(s) PG on the display panel 116 to acquire the attribute of the occupant(s) PG. When there are plural occupants PG, the term "attribute of occupants" used herein refers to the relationship of the plural occupants PG. In FIG. 7, those relationships that are considered as representative examples of the "attribute of occupants" are listed; however, the "attribute of occupants" to be displayed on the display panel 116 is not restricted to such relationships. When there is only a single occupant, for example, "not specify" may be selected, or any one of other attributes may be selected. The attribute input screen P2 is one example of the selection device according to the present disclosure. The control unit 138 of the control device 130 reads out a prescribed program stored in the memory unit 136 and executes the control of the selection device of the present disclosure.

In the step S14, the control device 130 acquires location information of the vehicle main body 104 from the location receiving device 144. In cases where the display panel 116 constitutes a car navigation system, the location information can also be used for the car navigation system.

Next, in the step S16, the control device 130 acquires "location-related information" based on the "destination" of the vehicle main body 104, the "attribute" of the occupants, the "location information" of the vehicle main body 104 and the like. Here, a case where "Amusement park A" is set as the "destination" and "Family (with children)" is set as the "attribute" of the occupants will be described as an example.

Figure 9:
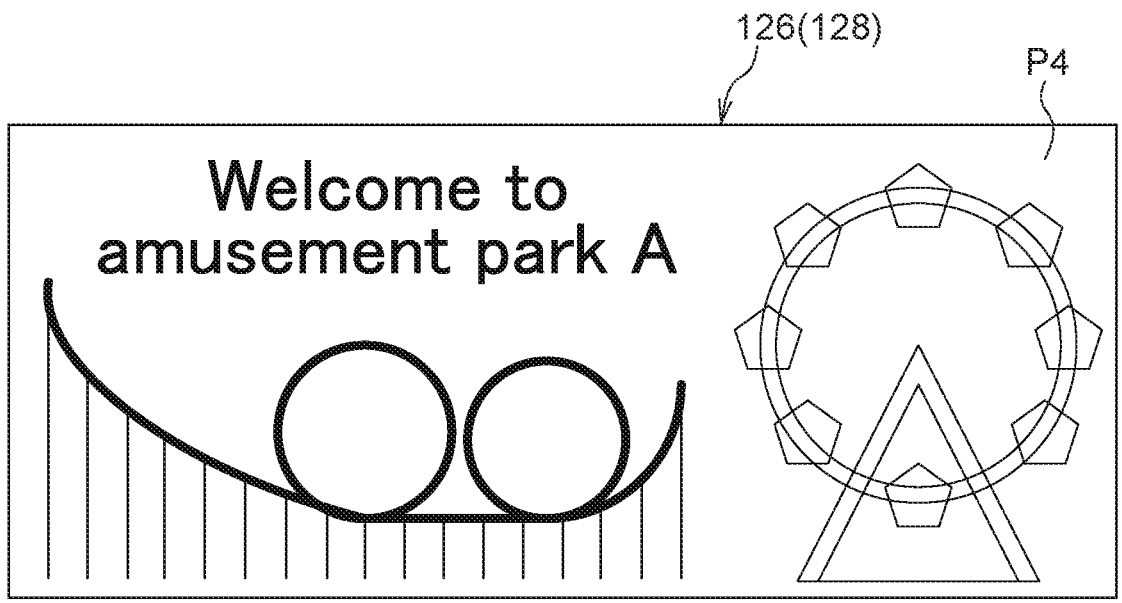
FIG. 9 is a drawing that illustrates one example of an image projected from the projection member in the vehicle of the first embodiment.
Figure 10:
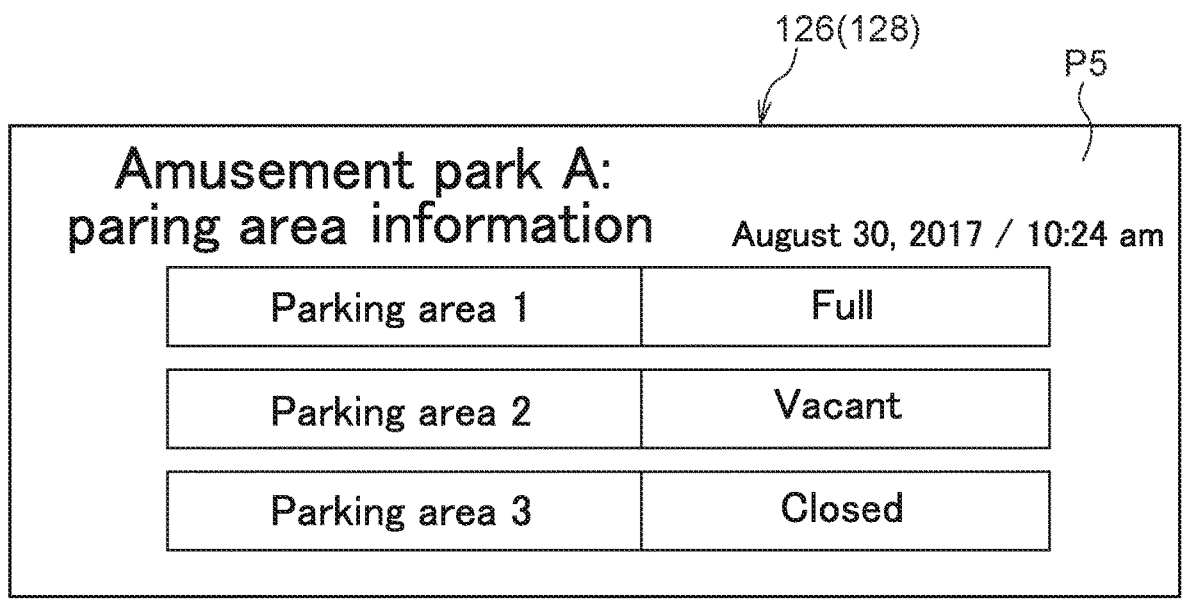
FIG. 10 is a drawing that illustrates another example of the image projected from the projection member in the vehicle of the first embodiment.

In this case, the control device 130, for example, accesses the home page (external server) of the amusement park A via the wireless communication device 146 and sets a display P4 of a home page content (see FIG. 9) as a piece of the "location-related information". When the home page of the amusement park A contains a page for children, since the "attribute of occupants" is "Family (with children)", the page for children may be added as a piece of the "location-related information". Further, the control device 130 may also acquire parking area congestion information of the amusement park A from the website of the amusement park A (or from other external server) and add this information as a display P5 of the "location-related information" (see FIG. 10). Moreover, the control device 130 may also acquire information on the weather at the address of the amusement park A from the website of the amusement park A (or from other external server) and add this information to the "location-related information". Particularly, if the parking area congestion information, the surrounding area weather information and the like are designed to be updated at certain time intervals, the occupants PG can obtain real-time information, which is highly convenient.

Figure 8:
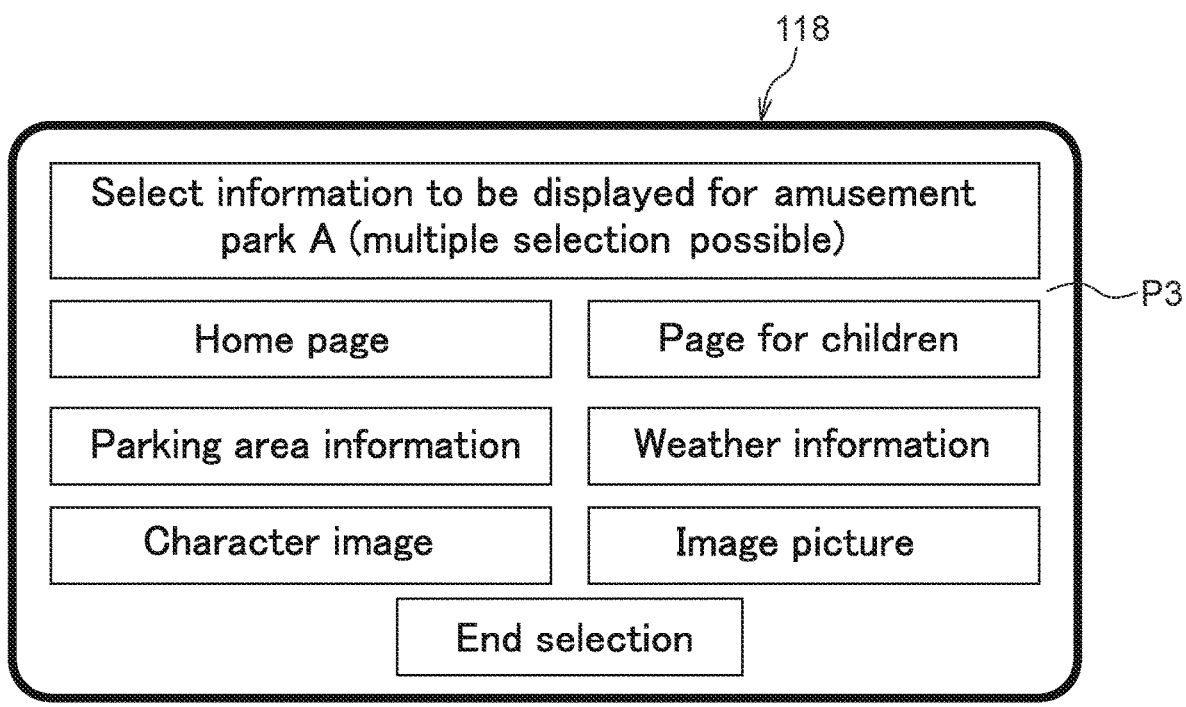
FIG. 8 is a drawing that illustrates yet another example of the image displayed on the display panel in the vehicle of the first embodiment.

In a case in which plural pieces of information have been obtained as the "location-related information" as described above, the control device 130 displays, on the display panel 116 as illustrated in FIG. 8, a selection screen P3 regarding which of the plural pieces of information should be selected. In the example illustrated in FIG. 8, plural pieces of information can be selected, and a button for instructing to end the selection is provided.

After the completion of the selection, the control device 130 proceeds to the step S18. In the step S18, the control device 130 projects one or more pieces of the thus selected information as a projected image 126 from the projection member 122 to the windshield 112. In a case in which plural pieces of information have been selected, they may be sequentially projected over time, or may be projected next to each other by dividing the projection area. In any case, the projected image 126 is projected to an area that does not affect the operations of the vehicle 102.

Next, in the step S20, the control device 130 detects whether or not the vehicle main body 104 is stopped based on the information detected by the vehicle speed sensor 142. When it is judged that the vehicle main body 104 is not stopped, since the vehicle main body 104 is believed to be travelling to the destination, the control device 130 returns back to the step S18 and continues to display the location-related information regarding the destination.

When the vehicle main body 104 is judged to be stopped, the control device 130 proceeds to the step S22. In the step S22, the control device 130 judges whether or not the vehicle main body 104 has arrived at the "destination". In other words, the control device 130 judges whether or not the current location of the vehicle main body 104 matches the "destination". When the vehicle main body 104 is judged to have arrived at the "destination" in the step S22, the control device 130 proceeds to the step S24.

In the step S24, the control device 130 judges whether or not the actuator has been turned off. When the actuator is judged to be off, since the vehicle main body 104 has come to stop arriving at the destination and the actuator has been turned off, the "location-related information display process" is terminated.

On the other hand, when it is judged that the actuator is not off, since the vehicle main body 104 is in a state where it has arrived at the destination but the actuator has not been turned off, it is presumed that, for example, the vehicle will be parked in the parking area of the destination and/or an occupant(s) other than the driver will get off the vehicle. Therefore, the control device 130 returns back to the step S18 and continues to project and display the location-related information regarding the destination from the projection member 122. For example, when the location-related information regarding the destination contains the congestion status of the parking area, it is convenient to display the congestion status of the parking area as the location-related information regarding the destination since this makes parking easy. Further, display of the internal map of the destination is also convenient since this makes it easy for the occupant(s) who have already left the vehicle to move on foot.

When the control device 130 judges in the step S22 that the vehicle main body 104 has not arrived at the "destination", the vehicle main body 104 is believed to be stopped or parked at a place other than the destination (e.g., a rest area, a parking area, a Michi-no-Eki, or a parking space of a commercial facility). In this case, the control device 130 proceeds to the step S26.

In the step S26, the control device 130 acquires the "location-related information" regarding the current location of the vehicle main body 104. As the "location-related information" in the step S26, for example, the names of notable tourist spots, commercial facilities and the like around the current location of the vehicle main body 104 are acquired nom the map database of the car navigation system. Then, based on the thus acquired names, information acquired from an external server or the like is set as the "location-related information" in the same manner as in the case of acquiring the "location-related information" of the "destination".

Thereafter, in the step S28, the control device 130 projects and displays the "location-related information" regarding the current location of the vehicle main body 104 as the projected image 126 from the projection member 122 to the windshield 112.

In the step S30, it is judged whether or not the vehicle main body 104 has started to move again. This judgement may be made based on the speed of the vehicle main body 104, or using the location information of the vehicle main body 104 that is received by the location receiving device 144.

When it is judged that the vehicle main body has not started to move again, since it is assumed that vehicle main body is still stopped, the control device 130 returns back to the step S28 and continues to display the location-related information regarding the current location. On the other hand, when it is judged that the vehicle main body has started to move again, it is believed that the vehicle main body 104 is again travelling to the destination. In this case, the control device 130 returns back to the step S18 and displays the location-related information regarding the destination.

As seen from the above descriptions, in this embodiment, since the "location-related information" associated with the "destination" is displayed by the projection member 122 on the windshield 112, the occupants PG can obtain useful information.

Further, as described above, in a state where the vehicle main body 104 is stopped and has not arrived at the destination, the location-related information relating to the current location of the vehicle main body 104 can also be displayed. Therefore, as compared to a configuration in which the location-related information regarding the current location is not displayed, the above-described embodiment attains superior convenience.

It is noted here, however, that such a configuration of not displaying the location-related information regarding the current location is not excluded. In other words, even if a vehicle does not display the location-related information regarding the current location, as long as the vehicle is capable of displaying the location-related information regarding the destination, the vehicle is more convenient than a vehicle that is configured not to display the location-related information regarding the destination.

As the location-related information regarding the current location, when the vehicle main body 104 is travelling, the location of the traveling vehicle main body 104 may be taken as the current location to acquire the location-related information. In this case, since the location of the vehicle main body 104 changes as the vehicle main body 104 travels, for example, an estimated location, which is the location at which the vehicle main body 104 is estimated to be after a prescribed time, may be regarded as the current location.

The location-related information may also be acquired from an internal database that has been stored in advance in the memory unit of the control device 130, instead of from an external database, or using an external database in combination. Acquisition of the location-related information from an external database is likely to provide more detailed information as compared to a case of acquiring the location-related information from an internal database. Further, as the location-related information, it is also possible to acquire information that has been updated in an external database. When an internal database of the control device 130 is used for the acquisition, the location-related information can be acquired, for example, even if an external database is not accessible.

In the above, a configuration that has the projection member 122 functioning as a head mount display was described as an example of the second display. The second display may take any configuration as long as it is capable of displaying the location-related information and may be, for example, the same panel as the display panel 116. Alternatively, it is possible to adopt a configuration in which plural self-luminous light sources are arranged as picture elements on an interior member of the vehicle compartment 106 (e.g., a door panel, roof panel, or a center console) and images are displayed using the plural light sources. Further, a configuration in which images are projected from a projection member and displayed on an interior member of the vehicle compartment 106 may be adopted as well. In this case, the arrangement position of the projection member may be in the dashboard as in the case illustrated in FIG. 3, or on the above-described interior member. For example, by projecting the scenery (landscape image or starry sky image) or the like of the destination on substantially the entire surface of the interior of the vehicle compartment, it is possible to convert the inside of the vehicle compartment into a space that gives a realistic feeling of being at the destination.

In the above, the vehicle 102 which includes the projection member 122 as an example of the display that displays the "location-related information" was described; however, the second display may take, for example, a configuration which includes the same display panel as the display panel 116. Further, the second display may also take a configuration which has only one display panel 116, or a configuration in which the display screen of the display panel 116 is divided into two sections such that one of the sections is used as a display screen of a car navigation system while the other section is used as a screen for displaying, the "location-related information". In this configuration, the display panel 116 functions as both the first display and the second display.

Further, the location-related information display processing performed by the CPU 202 reading the program in the embodiment described above may be performed various processors other than a CPU. In this case, an example of the processor includes a Programmable Logic Device (PLD), the circuit configuration of which can be changed after manufacturing the device, such as a Field-Programmable Gate Array (FPGA), and a specific electric circuit formed as a processor having a circuit configuration specifically designed for performing specific processing such as an Application Specific Integrated Circuit (ASIC). Further, the location-related information display processing may be performed by one of the various processors, or a combination of two or more of similar processors or different processors (for example, a combination of a plurality of the FPGAs, a combination of the CPU and the FPGA, or the like). Further, a hardware configuration of the various processors is specifically formed as an electric circuit combining circuit elements such as semiconductor element.

Further, in the embodiments described above, the location-related information display program is stored in the memory unit 136 or the ROM 204, however it is not limited to this. The program may be provided by a storage medium such as a Compact Disk Read Only Memory (CD-ROM), a Digital Versatile Disk Read Only Memory (DVD-ROM), and a Universal Serial Bus (USB) memory in which the program is stored. Further, the program may be downloaded from an external device through a network.

What is claimed is:

1. A vehicle comprising:
    a vehicle main body;
    an input device that receives a destination input operation;
    a first display that displays information on a route to a destination inputted by the input device, the first display being arranged in the vehicle main body;
    an acquisition device that acquires location-related information based on a current location of the vehicle main body or a location of a goal point of the vehicle main body; and
    a second display that displays the location-related information acquired by the acquisition device, the second display being arranged in the vehicle main body.

2. The vehicle according to claim 1, wherein the acquisition device sets the destination inputted by the input device as the location of the goal point.

3. The vehicle according to claim 1, wherein the acquisition device acquires the location-related information from an external database.

4. The vehicle according to claim 1, wherein, in a state in which the vehicle main body is stopped, the acquisition device takes information based on the stopped location as the location-related information.

5. The vehicle according to claim 1, wherein
    the vehicle comprises a selection device that selects an attribute of an occupant of the vehicle main body, and
    the second display displays the location-related information based on the attribute selected by the selection device.

6. A method for displaying information based on a location of a vehicle, the method comprising:
    receiving a destination input operation;
    displaying information on a route to the received destination at a first display disposed a a vehicle main body;
    acquiring location-related information based on a current location of the vehicle or a location of a goal point of the vehicle; and
    displaying the acquired location-related information at a second display disposed at the vehicle main body.

7. A non-transitory computer readable medium storing a program that causes a computer to execute a process for displaying information based on a location of a vehicle, the process comprising:
    receiving a destination input operation;
    displaying information on a route to the received destination at a first display disposed at a vehicle main body;
    acquiring location related information based on a current location of the vehicle or a location of a goal point of the vehicle; and
    displaying the acquired location-related information at a second display disposed at the vehicle main body.

\* \* \* \* \*

UNITED STATES PATENT AND TRADEMARK OFFICE
CERTIFICATE OF CORRECTION

PATENT NO. : 10,794,722 B2  
APPLICATION NO. : 16/225569  
DATED : October 6, 2020  
INVENTOR(S) : Megumi Amano et al.

Page 1 of 2

It is certified that error appears in the above-identified patent and that said Letters Patent is hereby corrected as shown below:

On the Title Page

Item (72), inventor 1, city, delete "Toyota" and insert --Toyota-shi Aichi-ken--, therefor.

Item (72), inventor 2, city, delete "Nagakute" and insert --Nagakute-shi Aichi-ken--, therefor.

Item (72), inventor 3, city, delete "Toyota" and insert --Toyota-shi Aichi-ken--, therefor.

Item (72), inventor 4, city, delete "Nagoya" and insert --Nagoya-shi Aichi-ken--, therefor.

Item (72), inventor 5, city, delete "Toyota" and insert --Toyota-shi Aichi-ken--, therefor.

Item (72), inventor 6, city, delete "Nagoya" and insert --Nagoya-shi Aichi-ken--, therefor.

In the Specification

In Column 3, Line(s) 36, after "and", delete ",".

In Column 4, Line(s) 50, delete "mariner" and insert --manner--, therefor.

In Column 5, Line(s) 28, delete "interne" and insert --internet--, therefor.

In Column 8, Line(s) 22, delete "nom" and insert --from--, therefor.

In Column 9, Line(s) 62, after "displaying", delete ",".

Signed and Sealed this  
Second Day of February, 2021

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 10,794,722 B2

In the Claims

In Column 10, Line(s) 62, Claim 6, before "a vehicle", delete "a" and insert --at--, therefor.

In Column 11, Line(s) 8, Claim 7, delete "location related" and insert --location-related--, therefor.